US012493780B2

(12) United States Patent
Lee et al.

(10) Patent No.: US 12,493,780 B2
(45) Date of Patent: Dec. 9, 2025

(54) NEUROMORPHIC CIRCUIT CAPABLE OF SETTING NEGATIVE WEIGHTS AND BACK PROPAGATION

(71) Applicant: Korea University Research and Business Foundation, Seoul (KR)

(72) Inventors: Hyung-Min Lee, Seoul (KR); Minil Kang, Seoul (KR); Min-Seong Um, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 839 days.

(21) Appl. No.: 17/825,574

(22) Filed: May 26, 2022

(65) Prior Publication Data

US 2023/0011215 A1    Jan. 12, 2023

(30) Foreign Application Priority Data

Jul. 6, 2021    (KR) .......................... 10-2021-0088327

(51) Int. Cl.
*G06N 3/063* (2023.01)
(52) U.S. Cl.
CPC ..................................... *G06N 3/063* (2013.01)
(58) Field of Classification Search
None
See application file for complete search history.

(56) References Cited

U.S. PATENT DOCUMENTS

| 8,589,320 B2 | 11/2013 | Breitwisch et al. |
| 2019/0019081 A1* | 1/2019 | Kim ................... G11C 13/0023 |
| 2019/0034788 A1 | 1/2019 | Burr |
| 2019/0122105 A1 | 4/2019 | Boybat Kara et al. |
| 2019/0156194 A1 | 5/2019 | Burr |
| 2019/0279079 A1* | 9/2019 | Sim ........................ G06N 3/065 |
| 2021/0209454 A1* | 7/2021 | Lee ........................ G06N 3/063 |

FOREIGN PATENT DOCUMENTS

| JP | 2020-528611 A | 9/2020 |
| JP | 2021-500646 A | 1/2021 |
| JP | 2021-503649 A | 2/2021 |
| KR | 10-2015-0034900 A | 4/2015 |
| KR | 10-2019-0133532 A | 12/2019 |
| KR | 10-2020-0100286 A | 8/2020 |
| KR | 10-2021-0000987 A | 1/2021 |

* cited by examiner

*Primary Examiner* — Eric Nilsson
(74) *Attorney, Agent, or Firm* — NSIP Law (57) ABSTRACT

Provided is a neuromorphic circuit including an input module configured to generate an input voltage, an output module configured to measure a current transmitted from the input module and generate an output voltage, synapse modules configured to electrically connect the input module and the output module and determine a current to be transmitted to the output module and including a memory element to which a weight is assigned, and a crossing module configured to control a direction of current flowing through the synapse modules.

10 Claims, 8 Drawing Sheets

NEUROMORPHIC CIRCUIT CAPABLE OF SETTING NEGATIVE WEIGHTS AND BACK PROPAGATION

CROSS-REFERENCE TO RELATED APPLICATION

This application claims priority to and the benefit of Korean Patent Application No. 10-2021-0088327, filed on Jul. 6, 2021, the disclosure of which is incorporated herein by reference in its entirety.

BACKGROUND

1. Field of the Invention

The present disclosure relates to a neuromorphic circuit capable of setting back propagation and negative weights.

2. Discussion of Related Art

As the era of big data has opened, a variety of technologies have been introduced, and deep learning, machine learning, and artificial intelligence among the technologies have drawn attention. As such, with the advent of big data technologies, a large amount of data has been used for modeling and the accuracy and efficiency of artificial intelligence are increasing accordingly.

To this end, various techniques for effectively performing deep learning and artificial intelligence are being studied. In most technologies currently used, digital programming techniques using supercomputers are used and many studies are being conducted to apply the digital programming techniques in analog form.

In this regard, an integrated circuit has a variety of advantages in terms of a small size, high reliability, extension of functions, and costs and thus have been applied to various types of systems. At the present time, deep learning techniques implemented by supercomputers are disadvantageous in that high power consumption and large areas are necessary to run programs.

To remedy the disadvantage, a neuromorphic technology for emulating the neural structure of the brain to significantly reduce hardware size and power consumption is becoming an issue. A neuromorphic system implemented in an analog form can be highly integrated using a crossbar-array structure and thus has drawn a lot of attention as a neuromorphic hardware structure.

Operations of such a neuromorphic system are largely divided into two parts, i.e., training and inference. Inference is a process of deriving a result value from input data using a predetermined weight, and training is a process of inputting a large number of data sets and changing a weight by comparing a result output from the neuromorphic system with a predetermined answer.

SUMMARY OF THE INVENTION

The present disclosure is directed to providing a neuromorphic circuit capable of performing forward propagation or back propagation by controlling a direction of current flowing through a synapse module and setting negative weights by controlling a voltage to be applied to the synapse module.

An aspect of the present disclosure provides a neuromorphic circuit including an input module configured to generate an input voltage, an output module configured to measure a current transmitted from the input module and generate an output voltage, synapse modules configured to electrically connect the input module and the output module and determine a current to be transmitted to the output module, the synapse modules each including a memory element to which a weight is assigned, and a crossing module configured to control a direction of current flowing through the synapse modules.

The crossing module may include a first switch configured to connect the input module and one side of the synapse module, a second switch configured to connect the output module and the other side of the synapse module, a third switch configured to connect the input module and the other side of the synapse module, and a fourth switch configured to connect the output module and one side of each of the synapse modules.

The crossing module may be provided to operate in a forward propagation mode or a back propagation mode, wherein a current is set to flow through the synapse modules in a first direction in the forward propagation mode and to flow through the synapse modules in a second direction opposite to the first direction in the back propagation mode.

The crossing module may be provided to transmit a current to the output module according to a synapse module connected to a column line in the forward propagation mode and according to a synapse module connected to a row line in the back propagation mode.

When one or more input modules and a plurality of output modules are provided, the crossing module may be provided to select output modules, the number of which is equal to the number of the one or more input modules and to pair and connect the selected output modules and the one or more modules.

When one or more input modules and a plurality of output modules are provided, synapse modules may be arranged in row lines, the number of which is equal to the number of the one or more input modules, and arranged in column lines, the number of which is equal to the number of the plurality of output modules.

When the number of the column lines and the number of the row lines are equal to each other, weights assigned to one or more synapse modules arranged in one or more row lines of one of the column lines may be set to cross weights assigned to one or more synapse modules arranged in one or more row lines of another of the column lines.

When the number of the column lines is greater than the number of the row lines, the weights may be set to cross each other in column lines, the number of which is equal to the number of the row lines among the plurality of column lines.

An arbitrary weight may be assigned to the synapse modules in the column lines, the number of which is greater than the number of the row lines.

The number of the synapse modules arranged in the column lines may be less than or equal to the number of the synapse modules arranged in the row lines.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, the present disclosure will be described in detail with respect to embodiments thereof as examples with reference to the accompanying drawings. These embodiments will be described herein in sufficient detail to enable those of ordinary skill in the art to practice the present disclosure. It should be understood that various embodiments of the present disclosure are different from each other but need not be mutually exclusive. For example, specific shapes, structures and characteristics described herein may be implemented in different embodiments without departing from the spirit and scope of the present disclosure in connection with an embodiment. In addition, it should be understood that the position or arrangement of each element in each embodiment set forth herein may be changed without departing from the spirit and scope of the present disclosure. Therefore, the following detailed description is not intended to restrict the present disclosure, and the scope of the present disclosure should be limited only by the appended claims, including all ranges equivalent to that defined in the claims when appropriately described. In the drawings, like reference numerals represent the same or similar functions in various aspects.

Hereinafter, example embodiments of the present disclosure will be described in detail with reference to the accompanying drawings.

Figure 1:
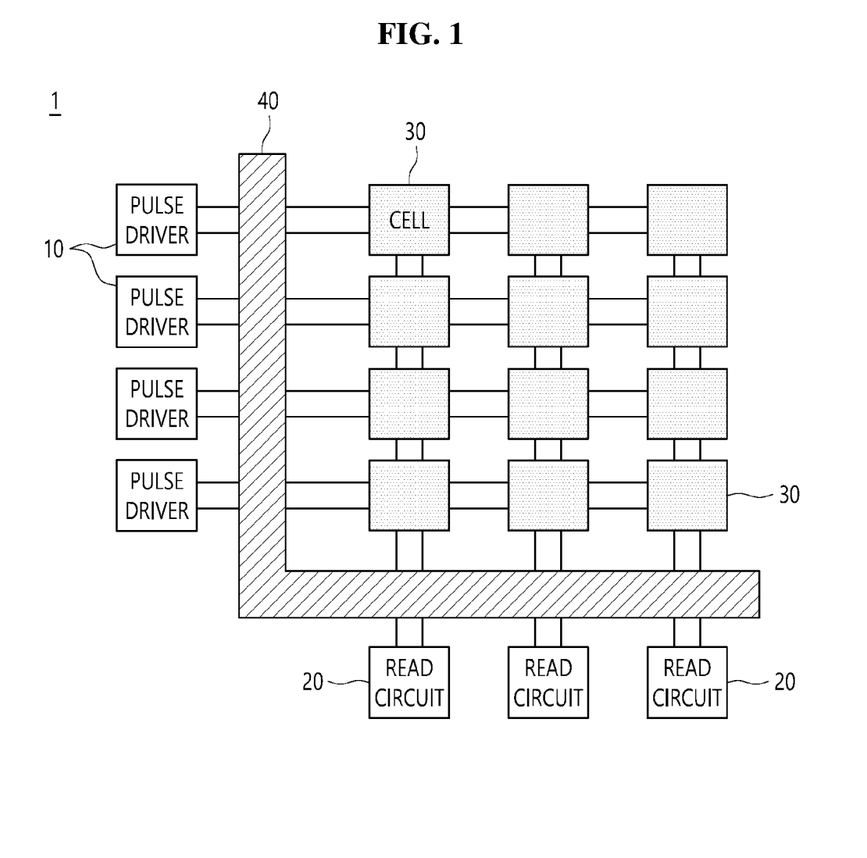
FIG. 1 is a circuit diagram of a neuromorphic circuit according to an embodiment of the present disclosure.

FIG. 1 is a circuit diagram of a neuromorphic circuit according to an embodiment of the present disclosure.

A neuromorphic circuit 1 may include an input module 10, an output module 20, a synapse module 30, and a crossing module 40.

The neuromorphic circuit 1 may include other components in addition to the components shown in FIG. 1 or may include only some of the components shown in FIG. 1. Alternatively, at least two components in the neuromorphic circuit 1 may be integrated into one component that performs multiple functions. The above-described components will be described in detail below.

The input module 10 may generate an input voltage. Thus, the input module 10 may generate an input voltage to represent an input value to be used in a learning or inference process of the neuromorphic circuit 1.

To this end, the input module 10 may be provided to generate different input voltages.

The output module 20 may measure a current transmitted from the input module 10 and generate an output voltage.

In this case, the output voltage of the output module 20 may be set to correspond to an input voltage during learning of the neuromorphic circuit 1, so that the synapse module 30 may learn a weight.

The synapse module 30 may be provided with a memory element 31 and a weight may be assigned to the memory element 31. The synapse module 30 may electrically connect the input module 10 and the output module 20 and determine a current to be supplied to the output module 20.

Accordingly, the synapse module 30 may learn a weight so that output voltages corresponding to different input voltages may be generated by the output module 20. Here, the learning of the weight by the synapse module 30 may be understood to mean that when different input voltages are input to the input module 10, a weight is set so that output voltages corresponding to the different input voltages may be generated in the output module 20.

For example, the synapse module 30 may set a weight by changing a resistance value of the memory element 31. To this end, the synapse module 30 may set different levels of conductance and thus may be provided to memorize the set different levels of conductance. Examples of the synapse module 30 may include a phase change random access memory, a resistive random access memory, a ferroelectric random access memory (FRAM), a flash memory, etc.

Accordingly, the output module 20 may receive a current from the input module 10 according to a weight set in the synapse module 30 during the inferring process of the neuromorphic circuit 1 and generate an output voltage corresponding to the current.

In this case, the neuromorphic circuit 1 may include a plurality of synapse modules 30 to make more complicated calculations.

The crossing module 40 may control a direction of current flowing through the synapse module 30. Thus, the neuromorphic circuit 1 may learn the weight of the synapse module 30 more accurately and quickly identify a synapse module 30 that malfunctions among a plurality of synapse modules 30 when an error occurs.

In this regard, the controlling of the direction of the current flowing through the synapse module 30 by the crossing module 40 may be understood to mean that the neuromorphic circuit 1 may be trained by forward propagation and back propagation.

In this case, the direction of the current flowing through the synapse module 30 described herein should be understood as being described based on a case in which an input voltage set for the input module 10 is higher than an output voltage set for the output module 20.

However, such a criterion is merely provided to clearly describe forward propagation and back propagation, and therefore, it should be understood that an actual direction of current may be different from the direction of current set according to the criterion when an input voltage is lower than or equal to an output voltage during the training of the neuromorphic circuit 1 through forward propagation or back propagation according to an embodiment of the present disclosure.

Figure 2:
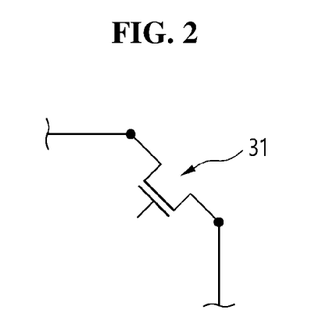
FIGS. 2 to 4 are circuit diagrams of examples of a synapse module of FIG. 1.
Figure 3:
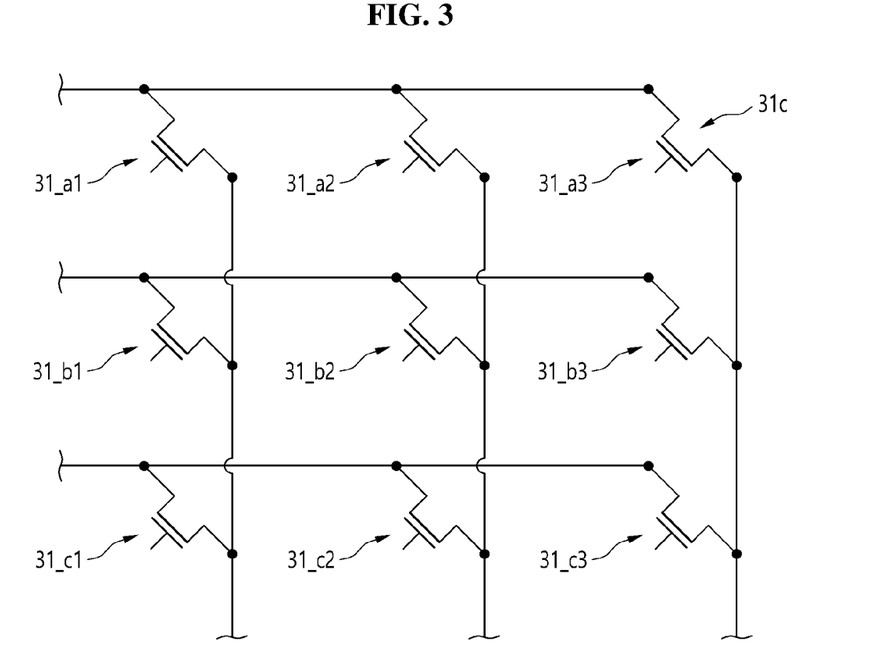
Figure 4:
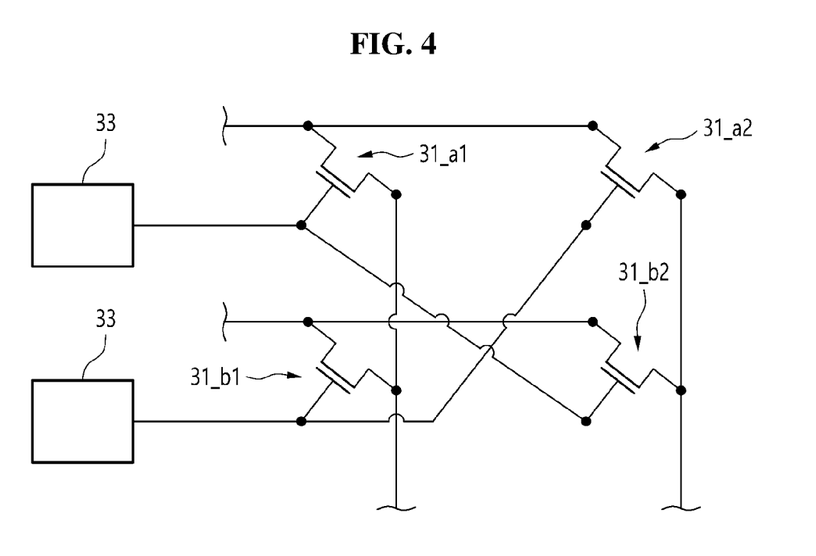

FIGS. 2 to 4 are circuit diagrams of examples of the synapse module 30 of FIG. 1.

Referring to FIG. 2, one synapse module 30 is installed in the neuromorphic circuit 1, and referring to FIG. 3, a plurality of synapse modules 30 are installed in the neuromorphic circuit 1.

In this regard, the synapse module 30 may be provided with one or more input modules 10 and a plurality of output modules 20. In this case, synapse modules 30 may be arranged in row lines, the number of which is equal to the number of the one or more input modules 10 and in column lines, the number of which is equal to the number of the plurality of output modules 20.

Here, the row lines may be understood to mean rows of a matrix, and the column line may be understood to mean columns of the matrix.

In this case, the number of the synapse modules 30 arranged in the column lines may be less than or equal to the number of the synapse modules 30 arranged in the row lines.

In an example embodiment, the number of the synapse modules 30 arranged in the column lines may be equal to the number of the synapse modules 30 arranged in the row lines.

Referring to FIG. 4, every two synapse modules 30 are paired and connected.

Here, the pairing and connection of every two synapse modules 30 may be understood to mean that a signal input to the synapse module 30 to determine a weight of the synapse module 30 is identically set for the other synapse modules 30.

To this end, the synapse module 30 may include a signal generator to generate a signal to generate a weight and maintain the signal.

Accordingly, the pairing and connection of every two synapse modules 30 may be understood to mean that different synapse modules 30 are set to be assigned the same weight.

As described above, when the number of column lines and the number of row lines are equal to each other, weights of one or more synapse modules 30 arranged in one or more row lines of one of the column lines may be set to cross those of synapse modules arranged in one or more row lines of another of the column lines.

For example, as shown in FIG. 4, when the neuromorphic circuit 1 is provided with two synapse modules 30 in a column line and two synapse modules 30 in a row line, i.e., a total of four synapse modules 30, a first synapse module 31_a1 and a fourth synapse module 31_b2 may be paired and connected and a second synapse module 31_a2 and a third synapse module 31_b1 may be paired and connected.

As shown in FIG. 3, when the neuromorphic circuit 1 is provided with three synapse modules 30 in a column line and three synapse modules 30 in a row line, i.e., a total of nine synapse modules 30, a first synapse module 31_a1, a sixth synapse module 31_b3, and an eighth synapse module 31_c2 may be paired and connected, a second synapse module 31_a2, a fourth synapse module 31_b1, and a ninth synapse module 31_c3 may be paired and connected, and a third synapse module 31_a3, a fifth synapse module 31_b2, and a seventh synapse module 31_c1 may be paired and connected.

When the number of column lines is greater than the number of row lines, weights may be set to be crossed for only column lines, the number of which is equal to the number of the row lines among the plurality of column lines.

When the number of column lines is greater than the number of row lines, the crossing module 40 may be provided to be connected only to the column lines, the number of which is equal to the number of the row lines among the plurality of column lines.

In this case, an arbitrary weight may be assigned to synapse modules 30 in column lines, the number of which is greater than the number of the row lines among the plurality of column lines.

FIGS. 5 to 8 are circuit diagrams of examples of the crossing module 40 of FIG. 1.

The crossing module 40 may include a first switch 41, a second switch 42, a third switch 43, and a fourth switch 44.

The first switch 41 may be provided to connect the input module 10 and one side of the synapse module 30, and the second switch 42 may be provided to connect the output module 20 and the other side of the synapse module 30.

The third switch 43 may be provided to connect the input module 10 and the other side of the synapse module 30, and the fourth switch 44 may be provided to connect the output module 20 and one side of the synapse module 30.

Thus, the crossing module 40 may be provided to operate in a forward propagation mode in which a current is set to flow through the synapse modules 30 in a first direction and a back propagation mode in which a current is set to pass through the synapse modules 30 in a second direction opposite to the first direction.

Figure 5:
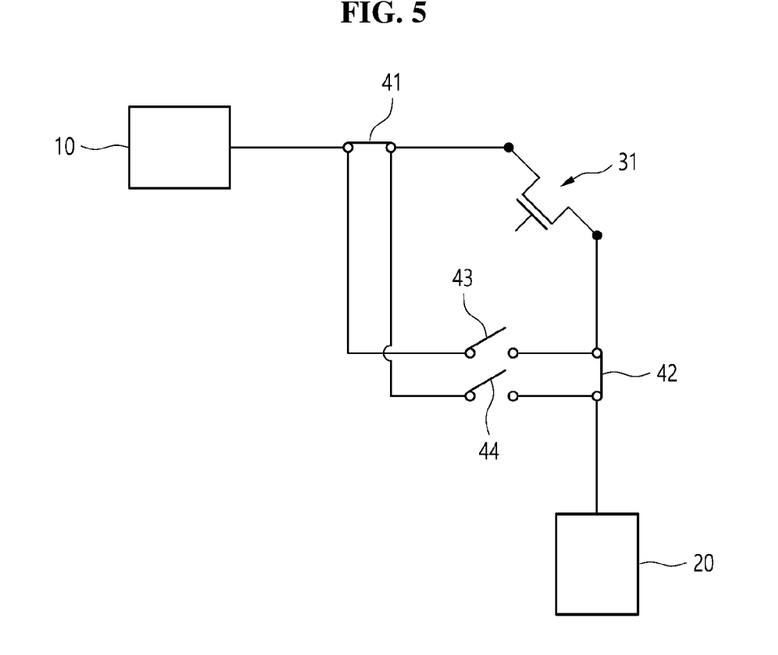
FIGS. 5 to 8 are circuit diagrams of examples of a crossing module of FIG. 1.

For example, in FIG. 5, the first direction may refer to a direction in which a current flows from an upper node of the memory element 31 to a lower node of the memory element 31, and the second direction may refer to a direction in which a current flows from the lower node of the memory element 31 to the upper node of the memory element 31.

However, it will be understood that the first direction and the second direction have been described herein based on a case in which the input voltage set for the input module 10 is higher than the output voltage set for the output module 20, and thus, an actual direction of a current in the forward propagation mode may be different from the first direction when the input voltage is lower than or equal to the output voltage and an actual direction of a current in the back propagation mode may be different from the second direction when the input voltage is less than or equal to the output voltage.

Figure 7:
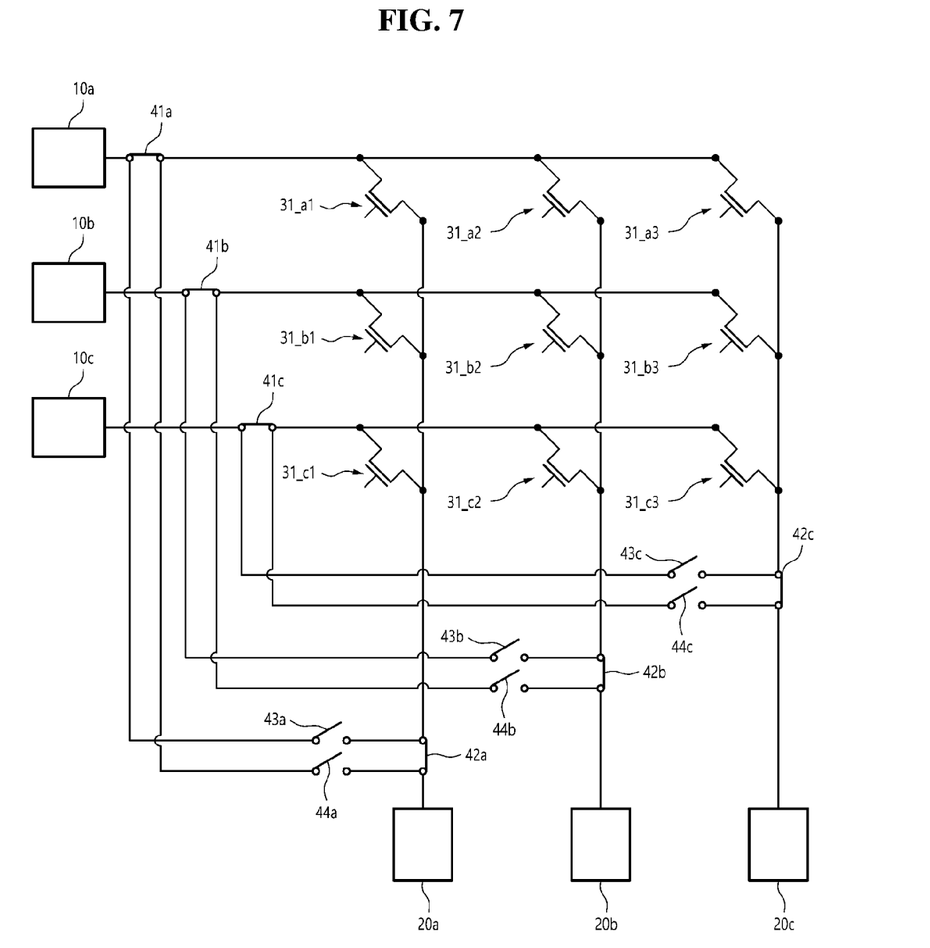

When the crossing module 40 operates in the forward propagation mode, the first switch 41 and the second switch 42 may be turned on to be electrically connected and the third switch 43 and the fourth switch 44 may be turned off to be electrically disconnected.

Figure 6:
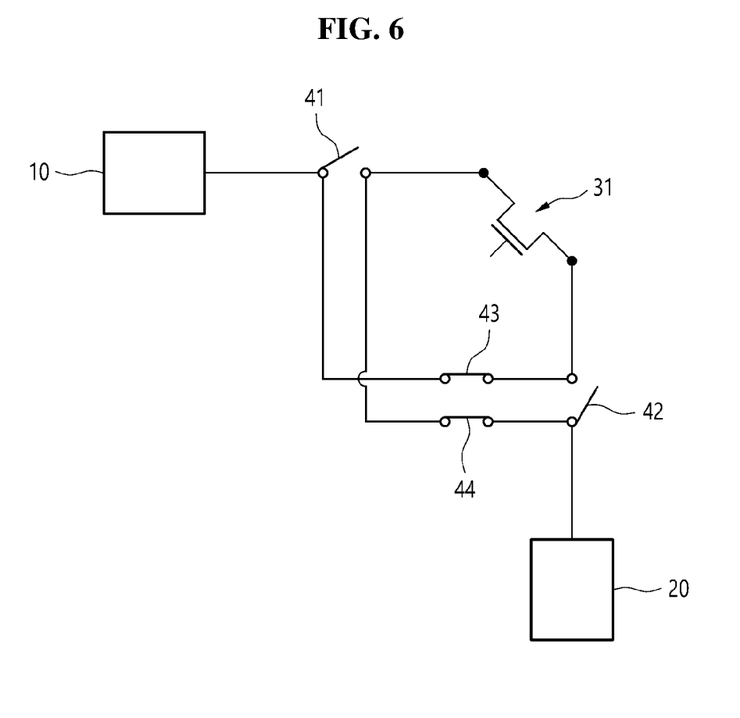
Figure 8:
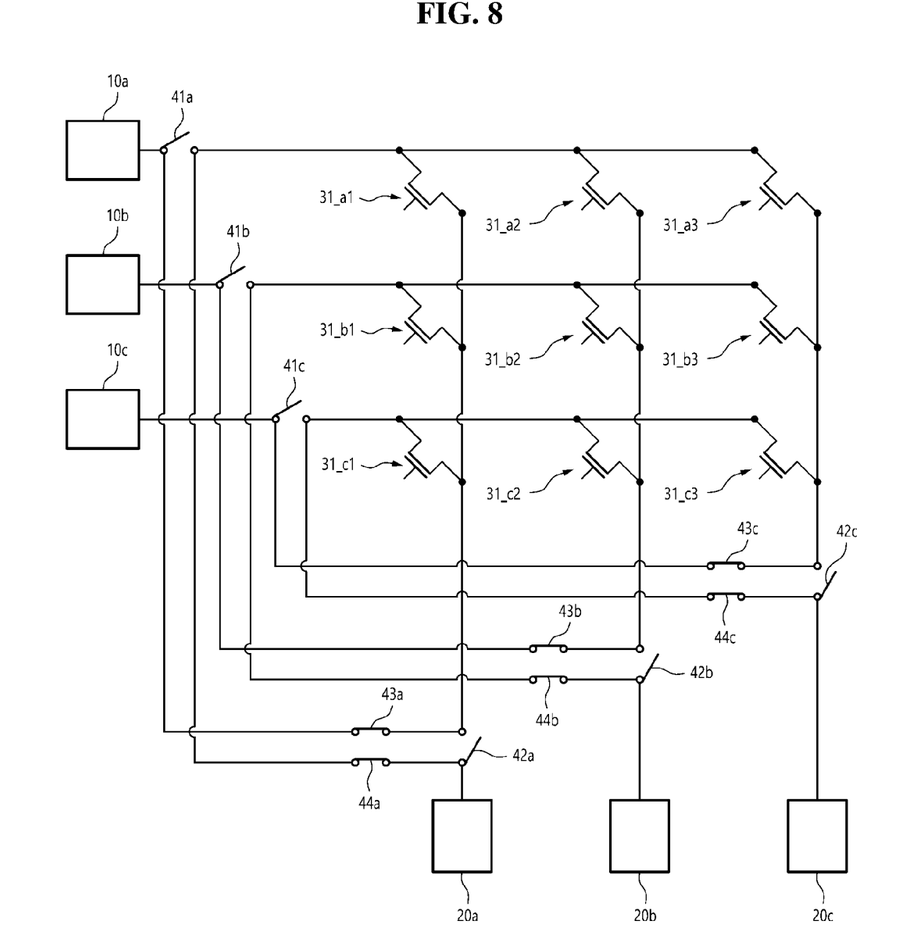

When the crossing module 40 operates in the back propagation mode, the first switch 41 and the second switch 42 may be turned off to be electrically disconnected and the third switch 43 and the fourth switch 44 may be turned on to be electrically connected.

Accordingly, the crossing module 40 may be provided to supply a current to the output module 20 according to a synapse module 30 connected to a column line in the forward propagation mode, and supply a current to the output module 20 according to a synapse module 30 connected to a row line in the back propagation mode.

In this regard, FIG. 5 illustrates an example in which a neuromorphic circuit 1 with one synapse module 30 operates in the forward propagation mode, and FIG. 6 illustrates an example in which the neuromorphic circuit 1 with one synapse module 30 operates in the back propagation mode.

FIG. 7 illustrates an example in which a neuromorphic circuit 1 with nine synapse modules 30 operates in the forward propagation mode, and FIG. 8 illustrates an example in which the neuromorphic circuit 1 with nine synapse modules 30 operates in the back propagation mode.

In this case, a first output module 20a may be supplied with a current according to synapse modules 31_a1, 31_b1, and 31_c1 connected to a first column line in the forward propagation mode, a second output module 20b may be supplied with a current according to synapse modules 31_a2, 31_b2, and 31_c2 connected to a second column line in the forward propagation mode, and a third output module 20c may be supplied with a current according to synapse modules 31_a3, 31_b3, and 31_c3 connected to a third column line in the forward propagation mode.

In addition, the first output module 20a may be supplied with a current according to synapse modules 31_a3, 31_a2, and 31_a1 connected to a first row line in the back propagation mode, the second output module 20b may be supplied with a current according to synapse modules 31_b3, 31_b2, and 31_b1 connected to a second row line in the back propagation mode, and the third output module 20c may be supplied with a current according to synapse modules 31_c3, 31_c2, and 31_c1 connected to a third row line in the back propagation mode.

In this regard, a weight for the synapse module 30 may be set to be a negative weight when an input voltage set in an arbitrary input module 10 is lower than an output voltage set in an arbitrary output module 20.

In this case, as described above, it may be understood that the synapse module 30 is paired and connected with a synapse module 30 arranged in a different column line and a different row line to set weights in a symmetrical structure, and therefore, a learning result of the synapse module 30 in the forward propagation mode and a learning result of the synapse module 30 in the back propagation mode may be the same when an input voltage and an output voltage are the same in the forward propagation mode and the back propagation mode.

As described above, an aspect of the present disclosure provides a neuromorphic circuit capable of setting back propagation and negative weights, and thus, a direction of a current flowing through a synapse module may be controlled to perform a forward propagation or back propagation operation and a voltage applied to the synapse module may be controlled to set negative weights.

While the present disclosure has been described above with respect to embodiments thereof, it will be understood by those of ordinary skill in the art that various changes and modifications may be made without departing from the spirit and scope of the present disclosure defined in the following claims.

What is claimed is:

1. A neuromorphic circuit comprising:
   an input module configured to generate an input voltage;
   an output module configured to measure a current transmitted from the input module and generate an output voltage;
   synapse modules configured to electrically connect the input module and the output module and determine a current to be transmitted to the output module, the synapse modules each including a memory element to which a weight is assigned; and
   a crossing module configured to control a direction of current flowing through the synapse modules,
   wherein the crossing module includes four switches configured to selectively connect the input module and the output module to opposite sides of the synapse modules, including a first switch connecting the input module to a first terminal of a synapse module, a second switch connecting the output module to a second terminal of the synapse module, a third switch connecting the input module to the second terminal of the synapse module, and a fourth switch connecting the output module to the first terminal of the synapse module, and
   wherein during a forward propagation mode the first and second switches are turned on while the third and fourth switches are turned off, and during a back propagation mode the third and fourth switches are turned on while the first and second switches are turned off, thereby permitting current to flow only through selected connections.

2. The neuromorphic circuit of claim 1,
   wherein the forward propagation mode sets a current to flow through the synapse modules in a first direction, and the back propagation mode sets the current to flow through the synapse modules in a second direction opposite to the first direction.

3. The neuromorphic circuit of claim 2,
   wherein the crossing module is configured to transmit a current to the output module according to a synapse module connected to a column line in the forward propagation mode, and according to a synapse module connected to a row line in the back propagation mode.

4. The neuromorphic circuit of claim 3,
   wherein the crossing module is configured to transmit a current to the output module according to a synapse module connected to a column line in the forward propagation mode and according to a synapse module connected to a row line in the back propagation mode.

5. The neuromorphic circuit of claim 1,
   wherein, when one or more input modules and a plurality of output modules are provided, the crossing module is configured to select output modules, a number of which is equal to a number of the one or more input modules and to pair and connect the selected output modules and the one or more modules.

6. The neuromorphic circuit of claim 1,
   wherein, when one or more input modules and a plurality of output modules are provided, the synapse modules are arranged in row lines, a number of which is equal to a number of the one or more input modules, and in column lines, a number of which is equal to a number of the plurality of output modules.

7. The neuromorphic circuit of claim 6,
   wherein, when the number of the column lines and the number of the row lines are equal to each other, weights assigned to one or more synapse modules arranged in one or more row lines of one of the column lines are configured to cross weights assigned to one or more synapse modules arranged in one or more row lines of another of the column lines.

8. The neuromorphic circuit of claim 6,
   wherein, when the number of the column lines is greater than the number of the row lines, weights assigned to synapse modules are configured to cross each other in column lines, the number of which is equal to the number of the row lines among the column lines.

9. The neuromorphic circuit of claim 8,
   wherein an arbitrary weight is assigned to the synapse modules in the column lines, the number of which is greater than the number of the row lines.

10. The neuromorphic circuit of claim 6,
    wherein the number of the synapse modules arranged in the column lines is less than or equal to the number of the synapse modules arranged in the row lines.

* * * * *